US008805797B2

(12) United States Patent
Gunda et al.

(10) Patent No.: US 8,805,797 B2
(45) Date of Patent: Aug. 12, 2014

(54) OPTIMIZING WIDE AREA NETWORK (WAN) TRAFFIC BY PROVIDING HOME SITE DEDUPLICATION INFORMATION TO A CACHE SITE

(75) Inventors: Kalyan Chakravarthy Gunda, Bangalore (IN); Shah Mohammad Rezaul Islam, Tucson, AZ (US); Sandeep Ramesh Patil, Somers, NY (US); Riyazahamad Moulasab Shiraguppi, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 13/402,064

(22) Filed: Feb. 22, 2012

(65) Prior Publication Data

US 2013/0218848 A1 Aug. 22, 2013

(51) Int. Cl.
*G06F 7/00* (2006.01)
*G06F 17/30* (2006.01)

(52) U.S. Cl.
USPC .......................................................... 707/692

(58) Field of Classification Search
CPC .................... G06F 17/30156; G06F 17/30489; G06F 17/30067
USPC .......................................................... 707/692
See application file for complete search history.

(56) References Cited

U.S. PATENT DOCUMENTS

| | | | | |
|---|---|---|---|---|
| 2009/0187588 A1* | 7/2009 | Thambiratnam et al. | ...... | 707/102 |
| 2009/0198825 A1* | 8/2009 | Miller et al. | ................. | 709/230 |
| 2009/0210427 A1* | 8/2009 | Eidler et al. | .................... | 707/10 |
| 2009/0265473 A1* | 10/2009 | Hydrie et al. | ................. | 709/229 |
| 2009/0319473 A1* | 12/2009 | Rao et al. | ........................ | 707/2 |
| 2010/0332818 A1* | 12/2010 | Prahlad et al. | ............... | 713/150 |
| 2011/0016095 A1* | 1/2011 | Anglin et al. | ................. | 707/692 |
| 2011/0099154 A1* | 4/2011 | Maydew et al. | ............. | 707/692 |
| 2011/0184998 A1* | 7/2011 | Palahnuk et al. | ............ | 707/827 |
| 2011/0225211 A1* | 9/2011 | Mukherjee et al. | .......... | 707/812 |
| 2012/0016915 A1* | 1/2012 | Choi et al. | .................... | 707/823 |
| 2012/0204024 A1* | 8/2012 | Augenstein et al. | ......... | 713/150 |
| 2012/0239630 A1* | 9/2012 | Wideman et al. | ............ | 707/692 |
| 2013/0041808 A1* | 2/2013 | Pham et al. | .................... | 705/39 |

* cited by examiner

*Primary Examiner* — Rehana Perveen
*Assistant Examiner* — Mark E Hershley
(74) *Attorney, Agent, or Firm* — Griffiths & Seaton PLLC

(57) ABSTRACT

Methods, systems, and physical computer-readable storage medium are provided to optimize WAN traffic on cloud networking sites. In an embodiment, by way of example only, a method includes fetching deduplication information from a home site to build a repository comprising duplicate peer file sets, one or more of the duplicate peer file sets including one or more peer files, referring to the repository to determine whether a target file corresponds with a cache copy of a peer file of the one or more peer files included in the duplicate peer file sets, and creating a local copy of the peer file of the one or more peer files, if a determination is made that the target file corresponds with the cache copy of the peer file of the one or more peer files included in the duplicate peer file sets.

14 Claims, 2 Drawing Sheets

OPTIMIZING WIDE AREA NETWORK (WAN) TRAFFIC BY PROVIDING HOME SITE DEDUPLICATION INFORMATION TO A CACHE SITE

BACKGROUND OF THE INVENTION

1. Field of the Invention

The present invention relates in general to cloud computing networks, and in particular, to deduplication in cloud computing networks.

2. Description of the Related Art

Cloud computing is a paradigm in which tasks are assigned to a combination of connections, software, and services that are accessed over a network. This network of servers and connections is collectively known as "the cloud." Based on the number and type of resources that make up the cloud, these resources may require a great deal of storage space. Advances in disk and storage technologies have helped to manage performance and space requirements of network clouds. For example, deduplication techniques have been developed for maximizing available storage space in which redundant data or files are eliminated from storage, thereby increasing the storage capabilities of the cloud.

SUMMARY OF THE INVENTION

To provide seamless throughput across the cloud, a file-system caching layer integrated with a cluster file-system is implemented. The caching layer provides persistent storage at a local cache site, which masks wide-area network latencies and outages. In particular, when a client application attempts to initially access a file, the file is fetched from a home site (which includes source data) and is copied to the file system at the local cache site. Subsequent requests for the file are serviced from the local cache site to thereby eliminate need of a large amount of wide-area network (WAN) bandwidth, while file data is transferred using protocol where the home site acts as a network file system (NFS) server, and the local cache site acts as a NFS client.

A deduplication engine is implemented at the home site to minimize storage requirements and to improve bandwidth efficiency. Redundant data (e.g., secondary copies) are deleted such that a master copy remains at the home site and reference pointers are provided to the various local cache sites. In some instances, multiple files including identical data may be saved under different file names. However, the local cache site may recognize each file of the multiple files as including different data and thus, may send requests to the home site to fetch all of the copies. As a result, the local cache site may unknowingly fetch files that are already present in the local cache.

Methods, systems, and physical computer-readable storage medium are provided to optimize WAN traffic on cloud networking sites. In an embodiment, by way of example only, a method includes fetching deduplication information from a home site to build a repository comprising duplicate peer file sets, one or more of the duplicate peer file sets including one or more peer files, referring to the repository to determine whether a target file corresponds with a cache copy of a peer file of the one or more peer files included in the duplicate peer file sets, and creating a local copy of the peer file from the cache copy of the peer file of the one or more peer files, if a determination is made that the target file corresponds with the peer file of the one or more peer files included in the duplicate peer file sets.

In another embodiment, by way of example only, a system is provided that includes a remote cluster file system including a home storage server, a local cache cluster including a local cache manager in communication with a cache, and a wide area network providing communication between the remote cluster file system and the local cache cluster. The local cache manager is configured to fetch deduplication information from the home storage server to build a repository comprising duplicate peer file sets, one or more of the duplicate peer file sets including one or more peer files, to refer to the repository to determine whether a target file corresponds with a cache copy of a peer file of the one or more peer files included in the duplicate peer file sets; and to create a local copy of the peer file from the cache copy of the peer file of the one or more peer files, if a determination is made that the target file corresponds with the peer file of the one or more peer files included in the duplicate peer file sets.

In still another embodiment, by way of example only, a physical computer program product is provided that includes computer code for fetching deduplication information from a home site to build a repository comprising duplicate peer file sets, one or more of the duplicate peer file sets including one or more peer files, computer code for referring to the repository to determine whether a target file corresponds with a cache copy of a peer file of the one or more peer files included in the duplicate peer file sets, and computer code for creating a local copy of the peer file from the cache copy of the peer file of the one or more peer files, if a determination is made that the target file corresponds with the peer file of the one or more peer files included in the duplicate peer file sets.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide methods, systems, and computer program products that optimize WAN traffic across a cloud computing network, wherein a deduplication engine has been implemented. In an embodiment, a method includes fetching deduplication information from a home site to build a repository comprising duplicate peer file sets, one or more of the duplicate peer file sets including one or more peer files, referring to the repository to determine whether a target file corresponds with a cache copy of a peer file of the one or more peer files included in the duplicate peer file sets, and creating a local copy of the peer file from the cache copy of the peer file of the one or more peer files, if a determination is made that the target file corresponds with the cache copy of the peer file of the one or more peer files included in the duplicate peer file sets. The method can be performed at a local cache site or another remote site removed from the home site. By using the method, the local cache site is provided with intelligence to determine if data is already present therein to thereby avoid sending requests to the home site for the same data. In this way, unnecessary WAN latencies and use of WAN bandwidth are minimized. Additionally, the local cache site does not need to be aware of deduplication logic internals of the home site, and the home site does not need to keep track of data it sends to the local cache site.

Figure 1:
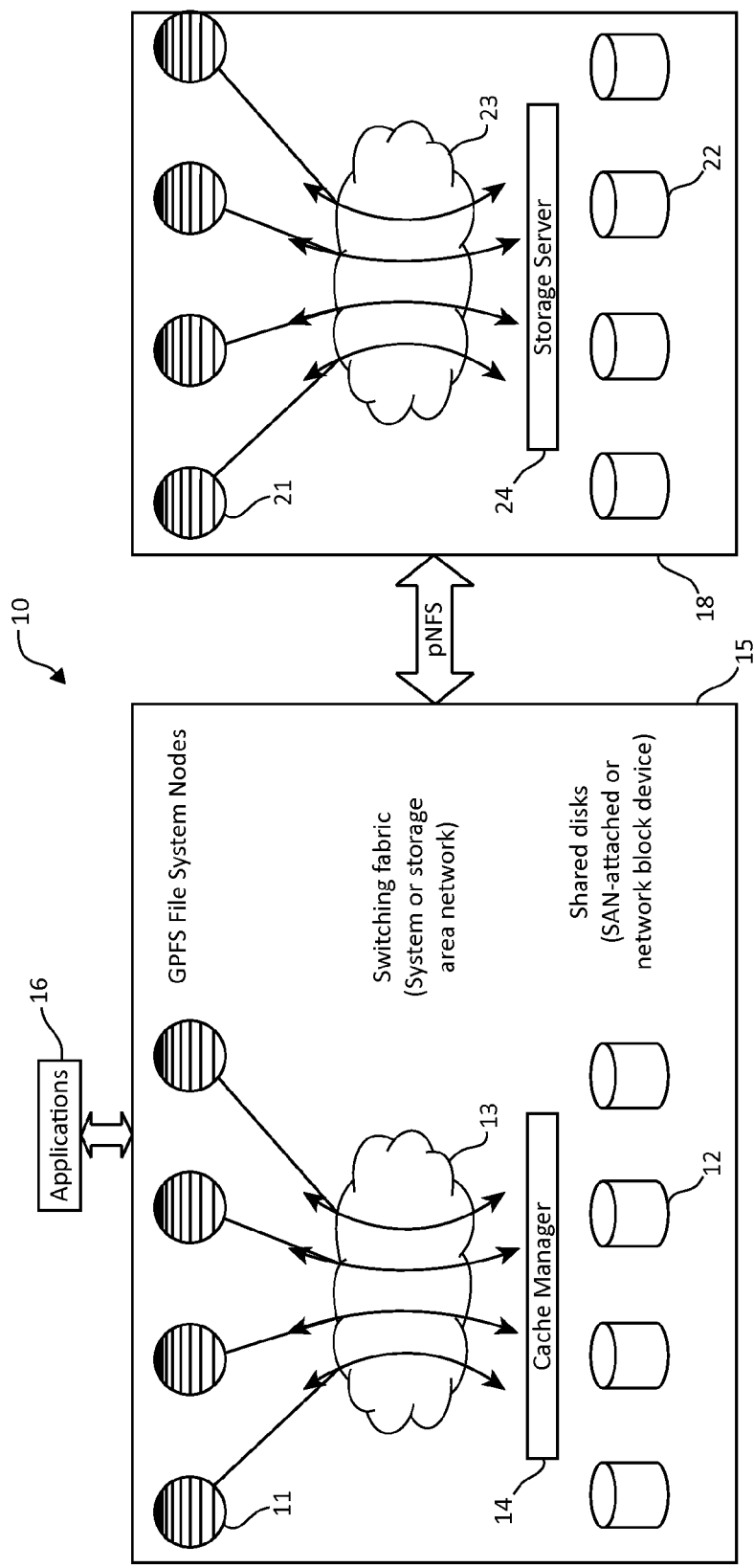
FIG. 1 is a block diagram of a system for caching remote file data in a local cluster file system, according to an embodiment.

FIG. 1 is a block diagram of a system 10 for caching remote file data in a local cluster file system, according to an embodiment. Referring to FIG. 1, the system 10 is a general parallel file system (GPFS) parallel cluster file system comprising a local cached file system cluster or local cache site 15 and a remote cluster file system or home site 18. The local cached file system cluster 15 stores cached data, while the remote cluster file system 18 stores original source data, such as source files. A parallel network file system (pNFS) is used to move the data between the cluster 15 and the remote cluster file system 18. In another embodiment, a network file system (NFS) is implemented between the cluster 15 and the remote cluster file system 18. Although shown only at cluster 15, GPFS is used for both file system clusters 15 and 18 to provide concurrent high-speed file access across multiple file system computing nodes of a cluster.

The cached cluster includes computing nodes 11 (e.g., processors), storage media 12, a switching fabric 13, and a cache manager 14. The nodes 11 are configured to support the GPFS file system and applications 16 that use the GPFS file system. The nodes 11 are connected to storage media 12, such as shared disks or disk subsystems, over a switching fabric 13. The cache manager 14 maintains cached data in the storage media 12 and intercepts the application file access requests from applications 16. All nodes 11 in the cluster have equal access to all disks 12. Files are striped across all disks 12 in the file system where the number of disks 12 can range from tens to several thousand disks. In addition to balancing the load on the disks, striping achieves the full throughput that a disk subsystem is capable of by reading and writing the blocks in parallel.

The switching fabric 13 that connects file system nodes 11 to the shared disks 12 may comprise a storage area network (SAN) such as fibre channel or iSCSI. Alternatively, individual disks 12 may be attached to some number of I/O server nodes that allow access from file system nodes 11 through a software layer running over a general-purpose communication network, such as IBM Virtual Shared Disk (VSD). Regardless of how shared disks 12 are implemented, the GPFS can assume a conventional block I/O interface with no particular intelligence at the disks 12. Parallel read-write disk accesses from multiple nodes 11 in the cluster 15 are synchronized to prevent corruption of both user data and file system metadata. The cluster 15 uses distributed locking to synchronize access to shared disks 12. Wherein distributed locking protocols ensure file system consistency regardless of the number of nodes 11 that simultaneously read from and write to a file system on the disks 12 on behalf of an application 16, while at the same time allowing data migration parallelism to achieve maximum throughput.

For parallel remote accesses over a wide area network (WAN), pNFS clients access storage devices in a remote cluster file system in parallel. This is achieved by separating the data and metadata paths, and by moving the metadata server out of the data path. As a result, each pNFS client can leverage the full aggregate bandwidth of the cluster file system. Using pNFS, clients can query the metadata server to determine the layout of how files are distributed across data servers. Layouts are maintained internally by the metadata server. Based on the file layout, the client is able to directly access the data servers in parallel. A pNFS client communicates with the data servers using a variety of storage access protocols, including NFSv4 and iSCSI/Fibre Channel. The pNFS specification allows for the addition of new layout distributions and storage access protocols, in addition to flexibility for implementation of the back-end storage system.

The remote cluster file system 18 includes nodes 21 (e.g., processors), storage media 22, a switching fabric 23, and a storage server 24. The nodes 21, storage media 22, and switching fabric 23 are configured similar to the nodes 11, storage media 12, and the switching fabric 13 of the local cluster 15, in an embodiment. In other embodiments, the nodes 21, storage media 22, and switching fabric 23 include fewer or more components than those of the local cluster 15. To reduce redundant data files, the remote cluster or home site 18 is implemented with a deduplication engine. The deduplication engine may span multiple storage volumes and storage pools. During operation of the deduplication engine, the storage server 24 may execute a deduplication protocol to deduplicate data in the remote cluster 18 (in particular, storage), leaving only one copy of the data to be stored. In another embodiment, the local cache cluster 15 is also implemented with a deduplication engine.

Figure 2:
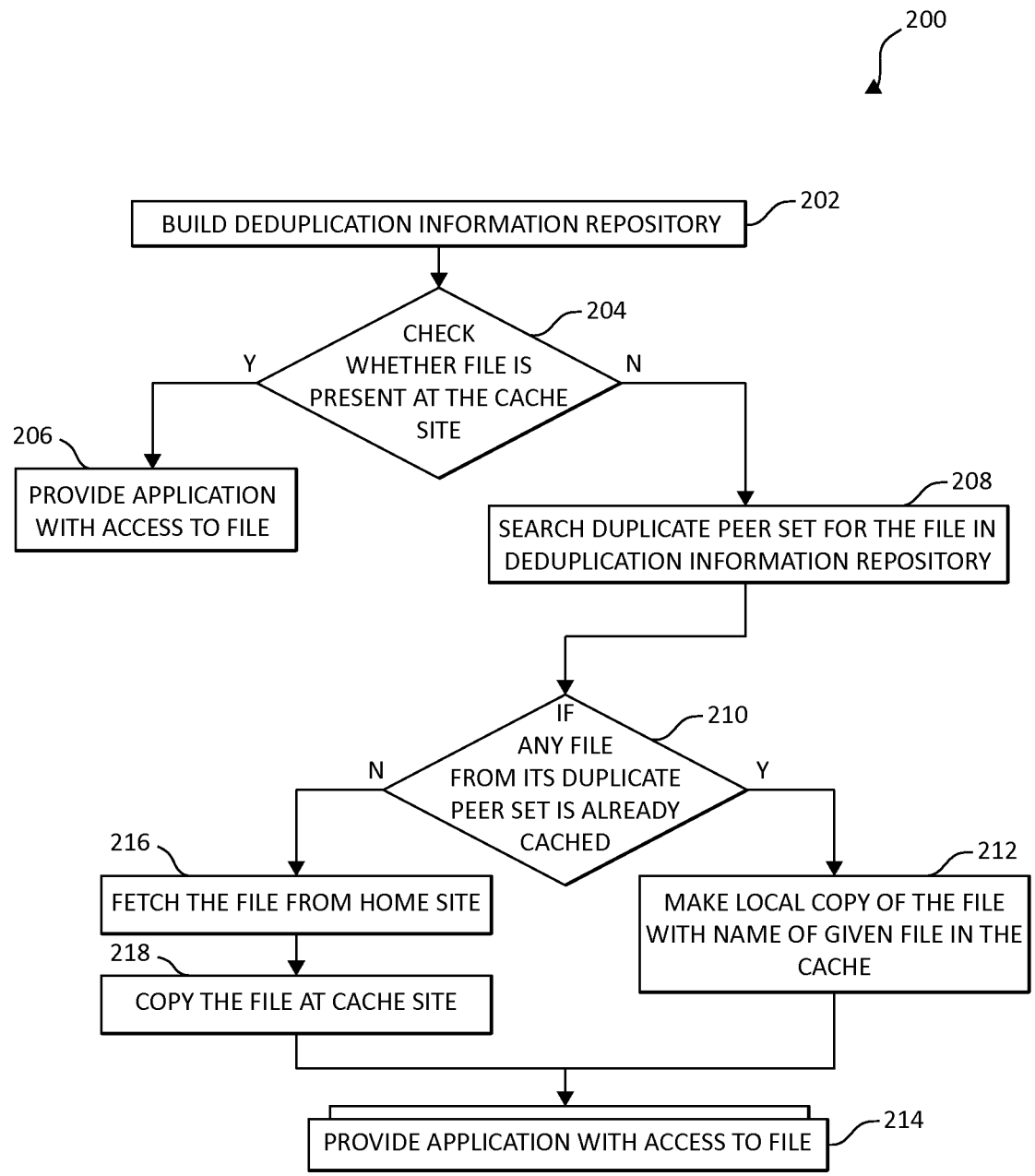
FIG. 2 is a flow diagram of a method of optimizing wide area network traffic, according to an embodiment.

The cache manager 14 is configured to reduce traffic between the local cluster 15 and the remote cluster 18 during servicing of file access requests. FIG. 2 is a flow diagram of a method 200 for optimizing WAN traffic by providing home site deduplication information to the local cluster 15, according to an embodiment. At 202, a repository is built comprising duplicate peer file sets. In an example, the cache manager 14 fetches deduplication information from a home site to build the repository. The deduplication information can be shared between the home site and the cache manager 14 in the form of a file including a deduplication metadata table, in an embodiment. In such case, the deduplication metadata table contains data related to master copies included at the home site and duplicate files pointing to the master copies. For example, the deduplication metadata table can include master copies having filenames including hash values (e.g., a particular signature added to the filenames) and pointers from duplicate files with hash values matching those of corresponding master copies.

The cache manager 14 creates the duplicate peer file sets by referring to the deduplication metadata table file. Each duplicate peer file set is a distinct group that includes one or more peer files. Each of the peer files in a single set are copies of the same file (e.g., all of the peer files contain the same data). In an embodiment, one or more of the peer files may have the same file name, but one or more of the peer files may be stored at different paths. Alternatively, one or more of the peer files have different file names. According to another embodiment, to denote that the peer files in a single duplicate peer file set are related to each other, each peer file in the single set contains identical hash values. For example, each file name includes 10-20 bits (or more or fewer bits) indicating that each file is related and/or identical to another file.

The following Table I is an example table including duplicate peer file sets:

TABLE I

| Set Number | Set Size | File list | Status |
|---|---|---|---|
| 1 | 3 | /home/pic.jpg, /home/area.jpg /home/diagram.jpg | Cached — — |

TABLE I-continued

| Set Number | Set Size | File list | Status |
|---|---|---|---|
| 2 | 1 | /home/office.db | Cached |
| 3 | 4 | /home/File1.wav | — |
|   |   | /home/File2.wav | — |
|   |   | /home/ibm/induction.wav | — |
|   |   | /home/new.wav | — |

As shown in Table I, the left column shows set numbers, each of which indicates a distinct set of peer files. The left middle column indicates how many peer files are included in the distinct set, and the right middle column lists the file names of each of the peer files. For example, set 1 includes three peer files (i.e., /home/pic.jpg, /home/area.jpg, /home/diagram.jpg), set 2 includes one peer file (i.e., /home/office.db), and set 3 includes four peer files (i.e., /home/File1.wav, /home/File2.wav, /home/ibm/induction.wav, /home/new.wav). Each peer file in each set is identical to each other, except that the peer files have different file names. The right column indicates whether a peer file has previously been cached. In an example, in set 1, file /home/pic.jpg is cached and the other two files are not cached. In set 2, /home/office.db is cached, while none of the files in set 3 have been cached.

In another embodiment, the deduplication information is shared by using file extended attributes to communicate lists of duplicate files, when a file among the set of duplicate files is initially accessed. In still another embodiment, a separate communication protocol is implemented between the home site and cache manager 14 for sharing the deduplication information. Alternatively, the deduplication information can be communicated between the home site and the cache manager 14 as a separate file. Moreover, it will be appreciated that although the deduplication information is illustrated as being contained in a table, such information is provided in another manner in other embodiments.

When a request is made from a client application 16 to access a target file, the cache manager 14 determines whether the target file is present in the cache at the local cluster 15 site, at 204. In an embodiment, the cache manager 14 checks the cache site and searches for the target file. If a peer file identical to the target file is present in the cache, the cache manager 14 provides the client application 16 with access to the target file in the cache, at 206. For example, with reference to Table 1 above, the cache manager 14 checks the status of the duplicate peer file sets in the repository to determine whether a peer file of a corresponding duplicate peer file set is cached. In an embodiment in which the target file corresponds to file /home/pic.jpg from set 1, the cache manager 14 recognizes from the status column that /home/pic.jpg is already cached. In such case, a local copy of /home/picjpg is made and access to that peer file is provided to the application 16.

If the target file is not present in the cache, the cache manager 14 refers to the repository to determine whether the target file corresponds with a peer file included in the duplicate peer file sets, at 208. For example, the cache manager 14 refers to the table in the repository to determine if a duplicate peer file set that is associated with the target file exists, at 210. If the associated duplicate peer file set exists, the cache manager 14 refers to the table to determine whether the associated duplicate peer file set includes a peer file present in the cache. If so, the cache manager 14 creates a copy of the peer file and gives the peer file copy a file name matching that of the target file, at 212. The cache manager 14 then provides the client application 16 with access to the peer file copy, at 214.

In an example with continued reference to Table 1, the cache manager 14 checks the status of the duplicate peer file sets to determine whether a peer file of a corresponding duplicate peer file set is cached. In an embodiment in which the target file corresponds to file /home/area.jpg from set 1, the cache manager 14 identifies an already cached peer file /home/pic.jpg included in the corresponding duplicate peer file set. In such case, a local copy of /home/picjpg is made and given the name /home/area.jpg. Access to new local copy /home/area.jpg is provided to the application 16, and the status of /home/area.jpg is marked in Table 1 as "cached."

By providing the table and cached copies locally, neither the cache manager 14 nor the client application 16 accesses the home site. As a result, traffic between the home site and cache manager 14 and client application 16 is minimized.

If no duplicate peer file set is associated with the target file, no associated peer file exists, or no cached copy of the associated peer file exists, the cache manager 14 fetches the target file from the remote cluster 18 or home site, at 216 and creates a cache copy (e.g., a new associated peer file, and thus, creates a duplicate peer file set) of the target file for the local cluster 15 or cache site, at 218. The cache manager 14 then provides the client application 16 with access to the new peer file copy, at 214.

With reference to Table 1, in an embodiment in which the target file corresponds to file /home/File1.wav from set 3, the cache manager 14 recognizes from the status column that no copy of /home/File1.wav has been cached. Accordingly, the cache manager 14 fetches the target file from the remote cluster 18 and creates a local copy of /home/File1.wav. The local copy of /home/File1.wav is renamed /home/new.wav and access to that peer file is provided to the application 16. The cache manager 14 updates the status of renamed file /home/new.wav as "cached," so that the cache manager 14 can respond to subsequent requests by using the cached copies of /home/new.wav.

Configuring the cache manager 14 to determine whether files containing data identical to the target file are already present at the cache site avoids circumstances under which requests for those already-present files are sent to the home site. As a result, bandwidth consumption is minimized and WAN latencies are reduced. Additionally, the cache manager 14 operates by focusing on read data traffic so that communication with the home site deduplication engine is circumvented.

Likewise, the home site does not monitor the data that it sends to the local cluster 15. Rather, the cache manager 14 synchronizes the deduplication information included in the repository with the deduplication information at the home site. For example, the cache manager 14 synchronizes each cache copy (e.g., peer file) with an updated corresponding source file at the home site. According to an embodiment, to do so, the cache manager 14 detects a modification in the deduplication information at the home site. In an embodiment, the cache manager 14 is implemented with a refresh interval counter to check for modifications at the home site. For example, during each refresh interval, each source file at the home site includes a version number, and the cache manager 14 compares the version numbers of each cache copy against the version numbers of the source files at the home site.

Next, the cache manger 14 updates deduplication information in the repository with the modification. In an example, if a change is detected in the deduplication information, the cache manager 14 fetches the modified deduplication information. In an embodiment, the home site triggers the cache manager 14 to perform a download whenever modifications appear at the home site. The cache manager 14 then rebuilds the duplicate peer file sets in the repository to include the modifications.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of optimizing wide-area network traffic comprising:

fetching deduplication information from a home site to build a repository including duplicate peer file sets and a table file, each duplicate peer file set being a distinct group and each including one or more peer files and at least one duplicate peer file set including two or more peer files, the one or more peer files in a single duplicate file set being copies of the same file, the table file comprising a listing of the duplicate peer file sets and an indication as to whether a cache copy of the one or more peer files exists on a local cache;

receiving a request to access a target file;

in response to the request, referring to the repository to determine whether the target file corresponds with a peer file of the one or more peer files included in the duplicate peer file sets and whether a cache copy of the peer file of the one or more peer files exists on the local cache;

creating a local copy of the peer file from the cache copy of the peer file of the one or more peer files, if a determination is made that the target file corresponds with the peer file of the one or more peer files included in the duplicate peer file sets and that the cache copy of the peer file of the one or more peer files exists on the local cache; and making a copy of a corresponding peer file of the one or more peer files in the repository, giving the copy of the corresponding peer file a file name matching that of the target file, and providing access to the copied corresponding peer file to a client application, if a determination is made that the target file corresponds with the peer file of the one or more peer files included in the duplicates peer file sets and no cache copy of the peer file of the one or more peer files exists on the local cache.

2. The method of claim 1, wherein the deduplication information comprises a master copy filename, one or more hash values, and reference to one or more duplicate files corresponding to the one or more hash values.

3. The method of claim 2, wherein the duplicate peer file sets comprise files including identical hash values.

4. The method of claim 1, wherein the step of copying is performed without accessing the home site.

5. The method of claim 1, further comprising:
if a determination is made that the target file does not correspond with the peer file of the one or more peer files included in the duplicate peer file sets, fetching the target file from the home site and creating a new copy of the target file for the local cache.

6. The method of claim 1, wherein:
each peer file comprises the cache copy and corresponds to a source file at the home site; and
the method further comprises synchronizing each cache copy with an updated corresponding source file at the home site.

7. The method of claim 6, wherein the step of synchronizing includes:
detecting a modification in the deduplication information at the home site;
updating deduplication information in the repository with the modification; and
rebuilding the duplicate peer file sets in the repository to include the modification.

8. A system for optimizing wide-area network traffic comprising:
a remote cluster file system including a home storage server;
a local cache cluster including a local cache manager in communication with a local cache; and
a wide area network providing communication between the remote cluster file system and the local cache cluster,
wherein the local cache manager is configured:
to fetch deduplication information from the home storage server to build a repository including duplicate peer file sets and a table file, each duplicate peer file set being a distinct group and each including one or more peer files and at least one duplicate peer file set including two or more peer files, the one or more peer files in a single duplicate file set being copies of the same file, the table file comprising a listing of duplicate peer file sets and an indication as to whether a cache copy of the one or more peer files exists on a local cache;
to receive a request to access a target file;
in response to the request, to refer to the repository to determine whether the target file corresponds with a peer file of the one or more peer files included in the duplicate peer file sets and whether a cache copy of the peer file of the one or more peer files exists on the local cache;
to create a local copy of the peer file from the cache copy of the peer file of the one or more peer files, if a determination is made that the target file corresponds with the peer file of the one or more peer files included in the duplicate peer file sets and that the cache copy of the peer file of the one or more peer files exists on the local cache; and
wherein the local cache manager is configured to interact with a client application and to make a copy of a corresponding peer file of the one or more peer files in the repository, giving the copy of the corresponding peer file a file name matching that of the target file and to provide access to the copied corresponding peer file to the client application, if a determination is made that the target file corresponds with the peer file of the one or more peer files included in the duplicate peer file sets and no cache copy of the peer file of the one or more peer files exists on the local cache.

9. The system of claim 8, wherein the local cache manager is further configured to copy the peer file without accessing the home site.

10. The system of claim 8, wherein:
each cache copy comprises a peer file a corresponding to a source file at the home site; and
the local cache manager is further configured to synchronize each cache copy with an updated corresponding source file at the home storage server.

11. The system of claim 10, wherein the local cache manager is further configured to detect a modification in the deduplication information, to update the deduplication information with the modification, and to rebuild the duplicate peer file sets to include the modification.

12. The system of claim 8, wherein the home storage server is further configured to provide the deduplication information as a deduplication metadata table associated with the home storage server.

13. A physical computer storage medium comprising a computer program product for optimizing wide-area network traffic, the physical computer storage medium comprising:
computer code for fetching deduplication information from a home site to build a repository including duplicate peer file sets and a table file, each duplicate peer file set being a distinct group and each including one or more peer files and at least one duplicate peer file set including two or more peer files, the one or more peer files in a single duplicate file set being copies of the same file, the table file comprising a listing of the duplicate peer file sets and an indication as to whether a cache copy of the one or more peer files exists on a local cache;
computer code for receiving a request to access a target file;
computer code for, in response to the request, referring to the repository to determine whether the target file corresponds with a peer file of the one or more peer files included in the duplicate peer file sets and whether a cache copy of the peer file of the one or more peer files exists on the local cache;
computer code for creating a local copy of the peer file from the cache copy of the peer file of the one or more peer files, if a determination is made that the target file corresponds with the peer file of the one or more peer files included in the duplicate peer file sets and that the cache copy of the peer file of the one or more peer files exists on the local cache; and
computer code for making a copy of a corresponding peer file of the one or more peer files in the repository, giving the copy of the corresponding peer file a file name matching that of the target file, and providing access to the copied corresponding peer file to a client application, if a determination is made that the target file corresponds with the peer file of the one or more peer files included in the duplicate peer file sets and no cache copy of the peer file of the one or more peer files exists on the local cache.

14. The physical computer storage medium of claim 13, further comprising computer code for creating the local copy of the peer file of the one or more peer files without accessing the home site.

* * * * *